US 6,643,399 B1

(12) United States Patent
Fujiwara

(10) Patent No.: US 6,643,399 B1
(45) Date of Patent: Nov. 4, 2003

(54) APPARATUS, METHOD, AND COMPUTER PROGRAM PRODUCT FOR NOISE REDUCTION IMAGE PROCESSING

(75) Inventor: Yoko Fujiwara, Setagaya-Ku (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/558,908

(22) Filed: Apr. 26, 2000

(30) Foreign Application Priority Data

Apr. 28, 1999 (JP) ............................................ 11-122749
Mar. 13, 2000 (JP) ....................................... 2000-068928

(51) Int. Cl.[7] ................................................ G06K 9/00
(52) U.S. Cl. ....................................... 382/167; 358/518
(58) Field of Search ................................. 382/162–167, 382/232–250; 358/504–540; 345/690–708

(56) References Cited

U.S. PATENT DOCUMENTS

| 4,769,696 A | * | 9/1988 | Utsuda et al. | ............... 358/527 |
| 5,359,437 A | * | 10/1994 | Hibi | ........................... 358/529 |
| 6,088,130 A | * | 7/2000 | Matsukubo | ................... 358/529 |
| 6,181,823 B1 | * | 1/2001 | Takahashi | .................... 382/232 |

FOREIGN PATENT DOCUMENTS

| JP | 361196674 A | * | 8/1986 | ............ H04N/1/40 |
| JP | 402295768 A | * | 12/1990 | .............. B41J/2/52 |
| JP | 3-276966 A | | 12/1991 | |
| JP | 4-248766 A | | 9/1992 | |
| JP | 05-294018 A | | 11/1993 | |

* cited by examiner

Primary Examiner—Jingge Wu
(74) Attorney, Agent, or Firm—Sidley Austin Brown & Wood LLP

(57) ABSTRACT

An apparatus for processing images including a compression-expansion unit, a first under color removing unit, and a second under color removing unit. The compression-expansion unit executes a compression and expansion process on an image data using discrete cosine transform. The first under color removing unit applies the first under color removal process to the image data before the compression and expansion process. The second under color removing unit applies the second under color removal process to the image data after the compression and expansion process.

24 Claims, 8 Drawing Sheets

FIG. 7

| COMPRESSION LEVEL | NOISE LEVEL |
|---|---|
| LEVEL 1 | 16 |
| LEVEL 3 | 12 |
| LEVEL 5 | 11 |
| LEVEL 7 | 6 |
| LEVEL 9 | 4 |

FIG. 8

| REMOVAL LEVEL | TARGET REMOVAL AMOUNT | REFLECTION CONVERSION VALUE (%) |
|---|---|---|
| 3 | 0 | 80 |
| 2 | 5 | 75 |
| 1 | 9 | 70 |
| 0 | 14 | 65 |
| -1 | 20 | 60 |
| -2 | 26 | 55 |
| -3 | 32 | 50 |

APPARATUS, METHOD, AND COMPUTER PROGRAM PRODUCT FOR NOISE REDUCTION IMAGE PROCESSING

This application is based on Japanese Patent Application No. 11-122749 filed on Apr. 28, 1999 and No. 2000-68928 filed on Mar. 13, 2000, the contents of which are hereby incorporated by reference.

BACKGROUND OF THE INVENTION

1. Field of the Invention

The present invention relates to the compression and expansion process of an image data using the discrete cosine transform technique, in particular, relative to the reduction of the mosquito noise.

2. Description of Related Art

Apparatuses such as copying machines, scanners and printers are capable of compressing and expanding an image data as well as removing under color from the image data.

The compression and expansion process is used for reducing the capacity requirement of a memory where the image data is stored and the JPEG (joint photographic experts group) method based on the discrete cosine transform is widely used. However, the compression and expansion process using the discrete cosine transform tends to cause the mosquito noise in the vicinity of an edge, where the density value of the pixel varies sharply, to cause deterioration of the picture quality. Incidentally, publication of Unexamined Japanese Patent Application, JP-A-5-294018 discloses a technique of removing the mosquito noise by means of correcting the data of the pixels in the vicinity of an edge using a filtering process.

On the other hand, the under color removal process is normally applied to images contained in printed matters such as newspapers and magazines, for example, images consisting of a nonwhite background and black characters. Specifically, the density value below a specified value is changed to "0" and the color of the background is changed to white. It is possible to allocate the maximum gradation to the necessary image data. However, the under color removal process increases the density differences among the image and the pixels in the vicinity of an edge.

Thus, the under color removal process is beneficial for securing the gradation but increases the chance of the mosquito noise generation during the compression and expansion process.

SUMMARY OF THE INVENTION

It is an object of the present invention to an apparatus for processing images including a compression-expansion unit, a first under color removing unit, and a second under color removing unit. The compression-expansion unit executes a compression and expansion process on an image data using discrete cosine transform. The first under color removing unit applies an under color removal process to the image data before the compression and expansion process. The second under color removing unit applies an under color removal process to the image data after the compression and expansion process.

A further object of the invention is to provide a method for processing images including the steps of executing a compression and expansion process on an image data using discrete cosine transform, applying an under color removal process to the image data before the compression and expansion process, and applying an under color removal process to the image data after the compression and expansion process.

Still a further object of the invention is to provide a computer program product for processing images including the steps of executing a compression and expansion process on an image data using discrete cosine transform, applying an under color removal process to the image data before the compression and expansion process, and applying an under color removal process to the image data after the compression and expansion process.

The objects, characteristics, and advantages of this invention other than those set forth above will become apparent from the following detailed description of the preferred embodiments, which refers to the annexed drawings.

BRIEF DESCRIPTION OF THE DRAWINGS

FIG. 7 is an example of the table showing the relation between the compression level and the mosquito noise level;

FIG. 8 is an example of the relation between the removal level, the removal amount and the reflection conversion value;

DETAILED DESCRIPTION OF THE EMBODIMENTS

The embodiments of this invention will be described below with reference to the accompanying drawings.

Embodiment 1

Figure 1:
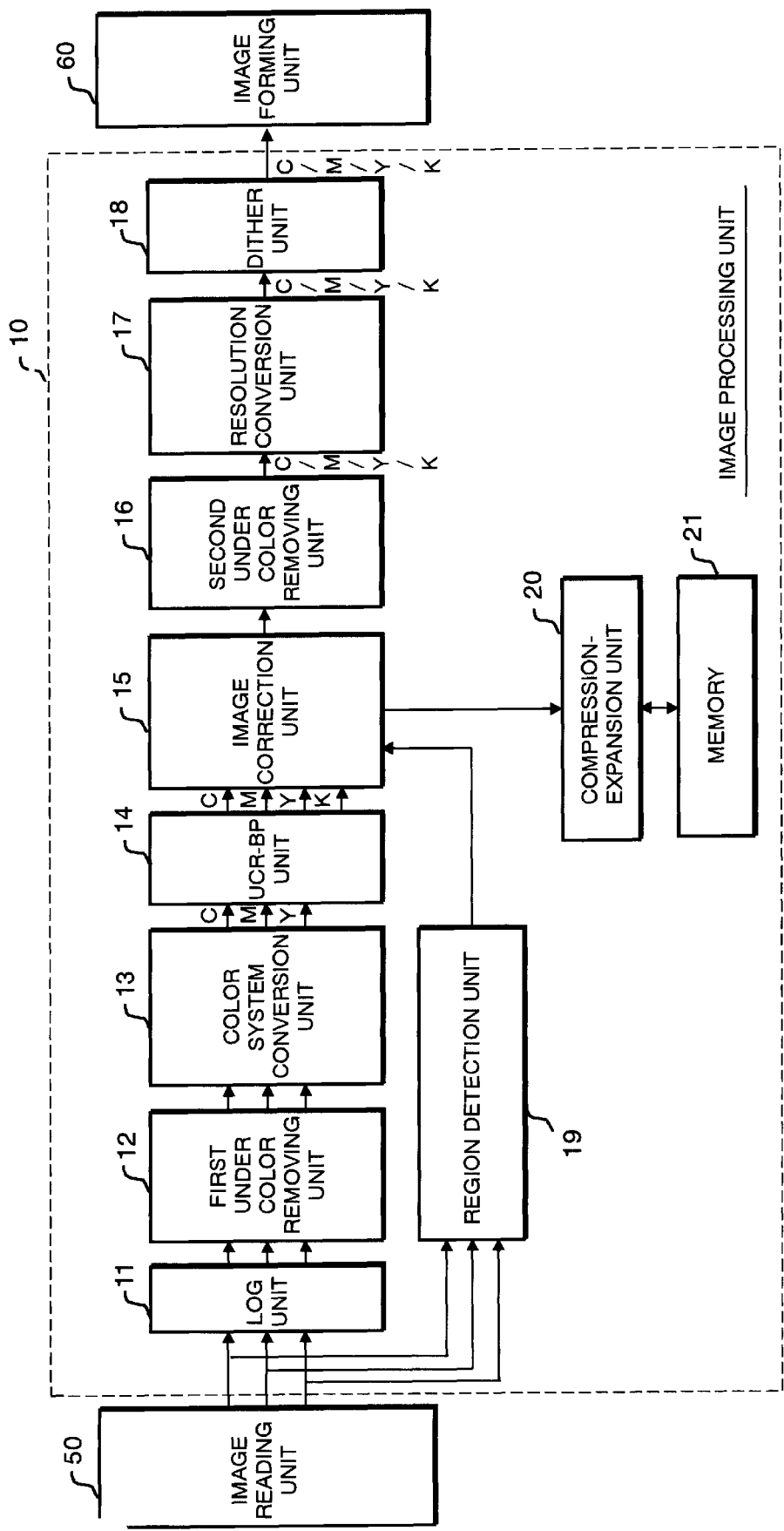
FIG. 1 is a block diagram of a digital copying machine of the embodiment 1.

The digital copying machine shown in FIG. 1 has an image reading unit 50 for reading the document image, an image processing unit 10 for applying various processes to the image data, and an image forming unit 60 for printing the image data on a paper. The image processing unit 10 has a LOG unit 11, a first under color removing unit 12, a color system conversion unit 13, a UCR (under color removal)-BP (black paint) unit 14, an image correction unit 15, a second under color removal unit 16, a resolution conversion unit 17, a dither unit 18, an region detection unit 19, a compression-expansion unit 20, and a memory 21. Since the basic control circuit and mechanical configuration of this digital copying machine are similar to those of the conventional machine, their descriptions are omitted.

Now, the outline of the operations of the digital copying machine is described along the flow of the image data.

The image reading unit 50 reads the document image and generates RGB image data consisting of reflectance data. The RGB image data is inputted into the LOG unit 11 and the region detection unit 19 of the image processing unit 10. Incidentally, R, G and B represent red, green and blue, respectively.

The LOG unit 11 logarithmically converts the RGB image data. The logarithmic image data, or the density data is treated by the first under color removal process at the first under color removing unit 12. The image data is then converted into CMY-image data at the color system conversion unit 13. The CMY-image data is converted into CMYK-image data at the UCR-BP unit 14. The CMYK-image data is inputted into the image correction unit 15. Incidentally, C, M, Y and K represent cyan, magenta, yellow and black, respectively.

The region detection unit 19 detects the region to which the RGB image data belongs. The detection result is inputted into the image correction unit 15.

The image correction unit 15 applies various corrections to the CMYK-image data. The corrections include the normal corrections such as the gamma correction, etc. and corrections corresponding to the detection result of the region detection unit 19, for example, the edge enhancement process or the smoothening process. The corrected image data is inputted into the compression-expansion unit 20, where the compression and expansion process is applied. More specifically, the compression-expansion unit 20 compresses the image data by means of the JPEG method using the discrete cosine transform and stores it in the memory 21, while it reads the compressed data from the memory 21 in synchronization with the print timing signal from the image forming unit 60 to expand it. The expanded image data is inputted into the second under color removing unit 16 via the image correction unit 15.

The second under color removing unit 16 applies the second under color removal process to the image data. The resolution of the resultant image data is converted to a value greater than the reading resolution of the image reading unit 50 at the resolution conversion unit 17. Next, the image data is compared to the dither table at the dither unit 18 and converted into binary data. The binary image data is inputted to the image forming unit 60 via a printer video interface not shown.

Next, the reason for executing the under color removal process before and after the compression and expansion process will be described below.

When the under color removal process is not applied, a problem occurs that the gradation range allocated to the necessary image data becomes narrower affected by the density value of the background. Heretofore, the under color removal process used to be applied only once to the image data before the compression and expansion process. The target removal amount of the under color removal process is the threshold value set up by the user. The density value below the target removal amount is converted to "0." Consequently, the density difference between the pixels in the vicinity of an edge increases and the generation of the mosquito noise increases during the compression and expansion process.

Figure 2:
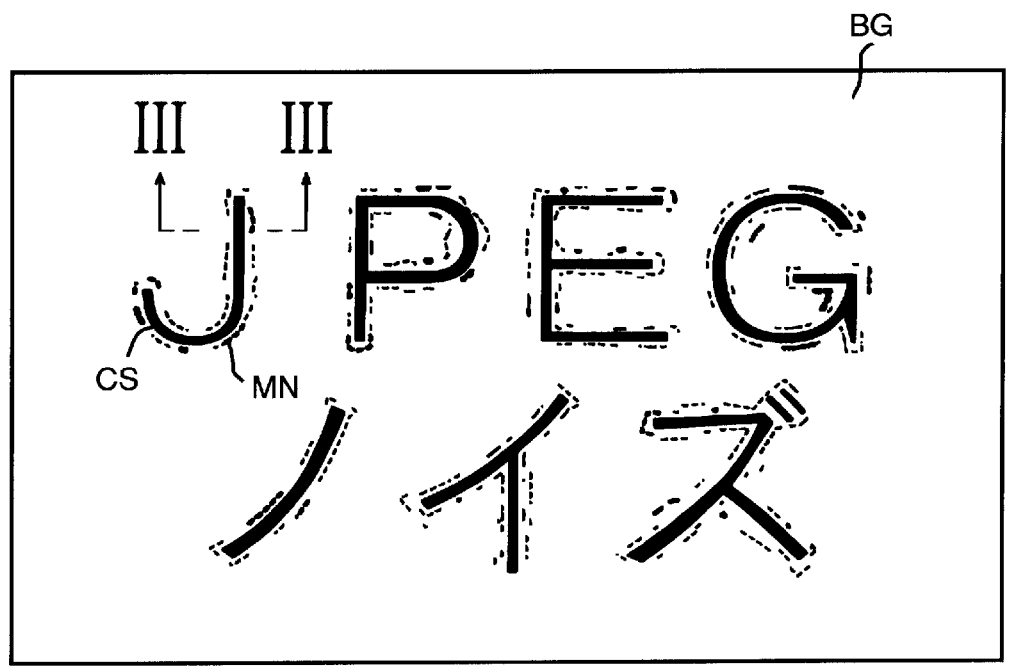
FIG. 2 is an example of the image having the mosquito noise.
Figure 3:
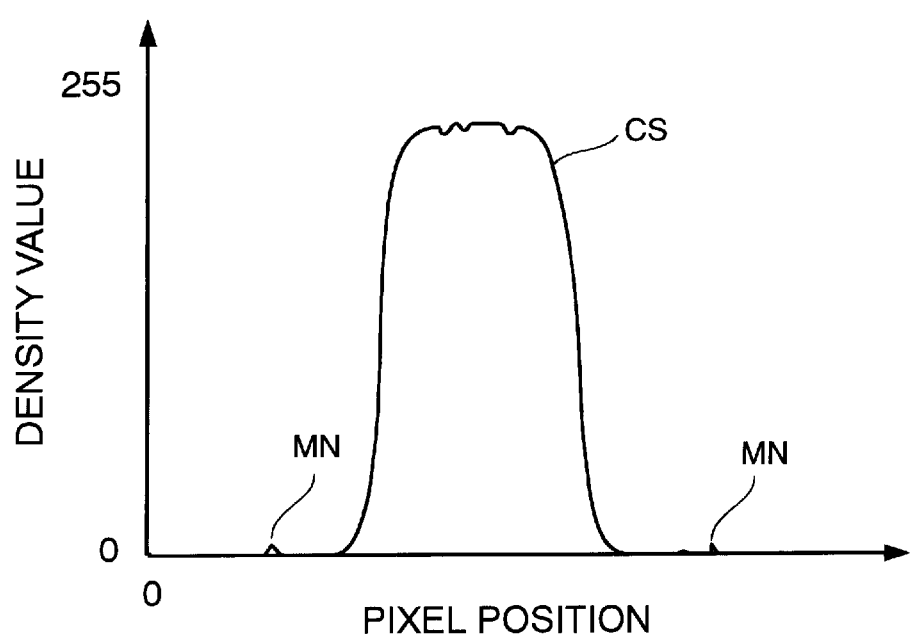
FIG. 3 is a graph showing the relation between the density value and the pixel position on line III—III of FIG. 2.

FIG. 2 shows how the mosquito noise occurs. Mosquito noise MN is occurring in the vicinity of the character CS written on the background BG. In other words, the mosquito noise MN tends to occur in the vicinity of the character segment consisting of letters and fine lines. From the graph of FIG. 3 showing the relation between the density value and the pixel position on line III—III of FIG. 2, it is clear that the mosquito noise MN is occurring at locations slightly apart from the character CS which is the original data. The density value of the mosquito noise MN is smaller than the density value of the character CS. Accordingly, the mosquito noise MN can be removed by applying the under color removal process.

The second removal amount, or the amount of the second under color removal process applied to the image data after the compression and expansion process is determined in correspondence with the density value of the mosquito noise. On the other hand, the first removal amount, or the amount of the first under color removal process applied to the image data prior to the compression and expansion process is determined in correspondence with the surplus of target removal amount over the second removal amount.

Thus, the mosquito noise is removed by applying the second under color removal process to the image data after the compression and expansion process. The securing of the gradation of the image data is accomplished by the combination of the first and second under color removal processes. Thus, according to this embodiment of the invention, the securing of the gradation and the removal of the mosquito noise can be accomplished simultaneously.

Embodiment 2

Figure 4:
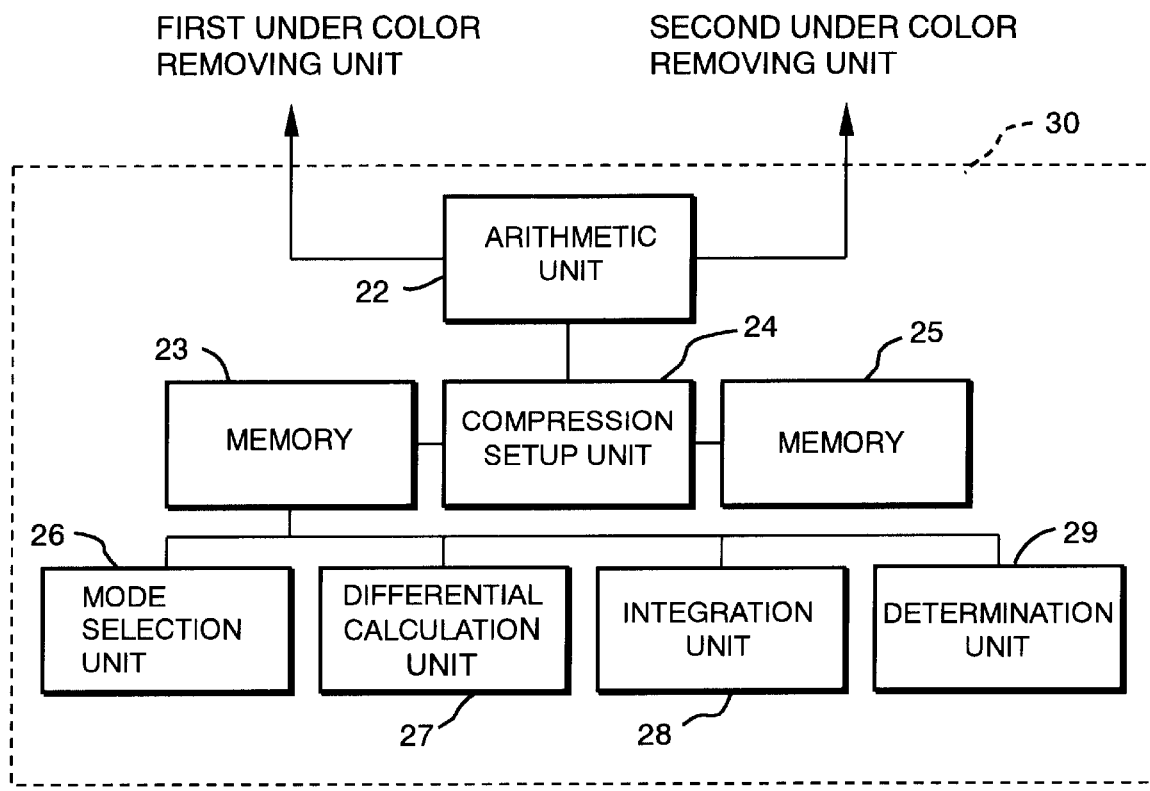
FIG. 4 is a block diagram of the major parts of an image processing unit according to the embodiment 2.

The digital copying machine of the embodiment 2 is different from the digital copying machine of the embodiment 1 in that the former is equipped with a setup unit 30 as shown in FIG. 4. The setup unit 30 has the capability of automatically setting the first removal amount and the second removal amount. The basic configuration of the digital copying machine of the embodiment 2 is the same as that shown in FIG. 1, so that its detailed description is not repeated here. The parts that are common with those in FIG. 1 are identified with the same symbols.

The setup unit 30 has an arithmetic unit 22, memories 23 and 25, a compression setup unit 24, a mode selection unit 26, a differential calculation unit 27, an integration unit 28, and a determination unit 29 as shown in the figure. The arithmetic unit 22 calculates the first removal amount and the second removal amount based on the noise level of the mosquito noise and the target removal amount. The noise level is the density value of the generated mosquito noise and is stored in the memory 23. On the other hand, the target removal amount is stored in the memory 25.

Now, the calculation of the noise level is described below.

The noise level generated by the compression and expansion process cannot be calculated until the image is actually read. Therefore, the mode selection unit 26 selects one of the pre-scan mode and the standard document mode as the initial setting mode. In the pre-scan mode, the noise level is determined by using the image data obtained by pre-scanning the actual document. In the standard document mode, the noise level is determined by using the image data obtained by scanning the standard document.

Figure 5:
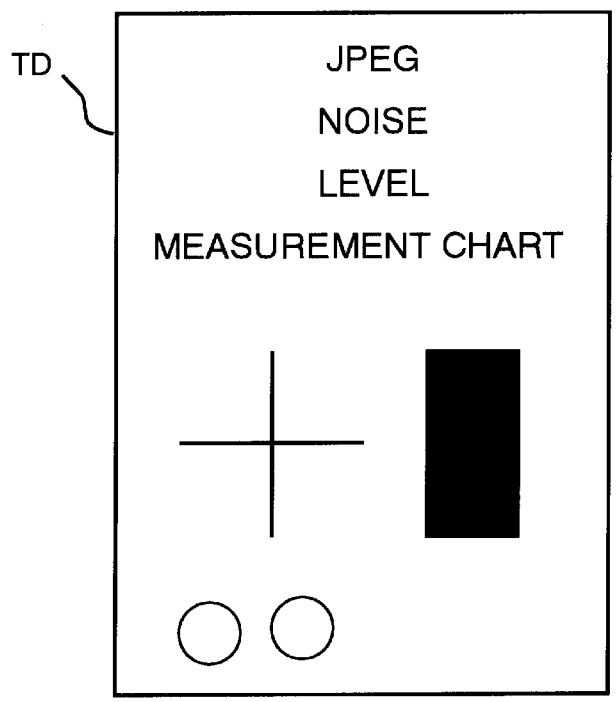
FIG. 5 is an example of the test image of a standard document.

The standard document has a test image consisting of letters and fine lines having edges. For example, in case of the standard document TD shown in FIG. 5, the test image has the letters "JPEG NOISE LEVEL Measurement Chart" and several graphic patterns.

Figure 6:
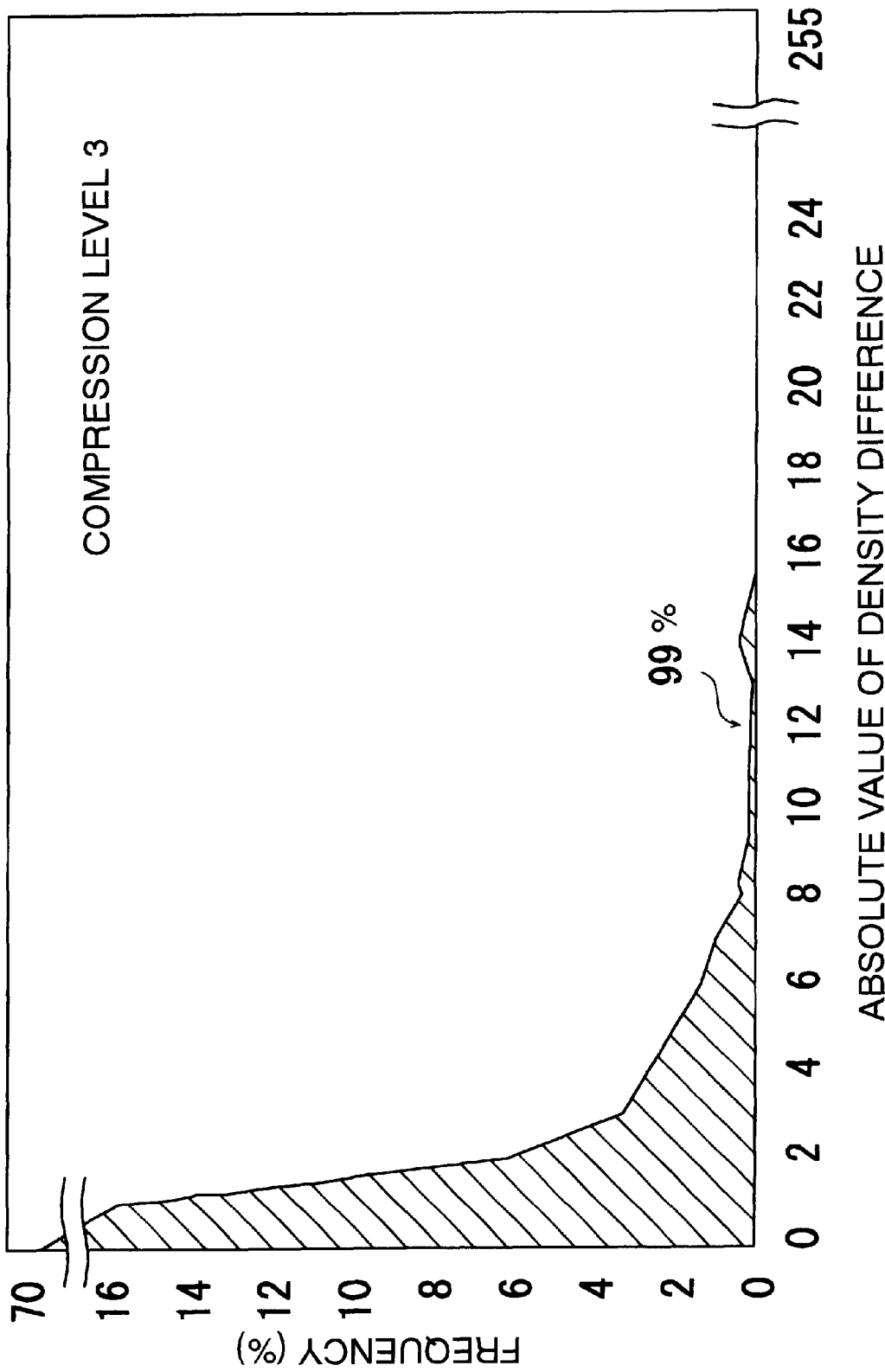
FIG. 6 is a histogram showing an example of the relation between the frequency and the absolute value of the density difference before and after the compression and expansion process.

The differential calculation unit 27 calculates the absolute value of the difference in the density before and after the compression and expansion process using the image data in correspondence with the selected initial setting mode. An example of the relation between the absolute value of the density difference and the frequency is shown as a histogram in FIG. 6. The frequency shown on the vertical axis is shown in percentage and the density value of the horizontal axis is expressed in 256 gradation steps.

The integration unit 28 integrates the frequencies of the absolute values of the density difference in the ascending order relative to the absolute values of the density difference. The determination unit 29 determines the absolute value of the density difference at which the ratio between the integration value and the sum of the frequencies reaches the specified value as the noise level. Said specified value is, for example, 99.0%. A table can be produced to show the relation between the compression level and the noise level by repeating the above process using appropriate quantization tables and various compression levels. FIG. 7 is an example of the table showing the relation between the compression level and the noise level. The compression level has a corresponding relation with the compression ratio and the compression level 1 represents the maximum compression ratio. The noise level increases as the compression level increases as shown on the table. Incidentally, the noise level may be stored in the memory 23 in the form of the table shown in FIG. 7.

The compression setup unit 24 sets up the compression level based on the user's setting or the comparison between the memory capacity and the image data capacity. The relation between the compression level and the noise level is not only set up independently for each equipment but can also be set up to a value commonly applicable to multiple equipment.

Next, the calculation of the target removal amount will be described below.

The target removal amount is determined based on the pre-scanning result or the removal level setup by the user. In various equipment such as digital copying machines and scanners, the removal level is related to the reflection conversion value of the document. An example of the relation between the removal level, the target removal amount, and the reflection conversion value is shown in FIG. 8. In FIG. 8, the removal level is divided into seven steps, from level 3 to level −3. Specifically, level 0, which serves as the datum, corresponds to the image data that has a reflection conversion value above 65% while the target removal amount is 14. The target removal amount can be stored in the memory 25 as a table format shown in FIG. 8.

Now, the calculation of the first removal amount and the second removal amount is described below.

As shown in the following formula, the arithmetic unit 22 calculates the second removal amount C2 based on the noise level NL, and then calculates the first removal amount C1 based on the second removal amount C2 and the target removal amount WL:

$$C2 = MAX(NL, 0)$$

$$C1 = WL - C2$$

The noise level is the density value of the generated mosquito noise. Therefore, the mosquito noise generated during the compression and expansion process can be removed by applying the second under color removal process where the noise level is set up as the second removal amount to the image data after the compression and expansion process. On the other hand, the first removal amount is a value obtained by subtracting the second removal amount from the target removal amount. In other words, the first removal amount is adjusted so that the sum of the second removal amount and the first removal amount becomes equal to the target removal amount. Thus, the gradation of the image data can be secured.

For example, the first removal amount and the second removal amount are calculated as follows when "3" is set to the compression level and "−3" is set to the removal level.

Since the compression level is "3," the noise level is determined to be "12" referring to the table shown in FIG. 7. Since the second removal amount is equal to the noise level, it is "12." On the other hand, since the removal level is "−3," it is determined that the corresponding target removal amount is "32" referring to the table shown in FIG. 8. Since the first removal amount is defined as the target removal amount (=32) minus the second removal amount (=12), it is "20."

It is preferable to correct the second removal amount, as, precisely speaking, it is affected by the first removal amount. The following is the formula for calculating the correction value C2' for the second removal amount:

$$C2' = C2 \times 255 / (255 - C1)$$

If the first removal amount and the second removal amount are "20" and "12," the correction value of the second removal amount is "13."

Next, the first under color removal process and the second under color removal process will be described below referring to the first removal amount and the correction value of the second removal amount.

Figure 9A:
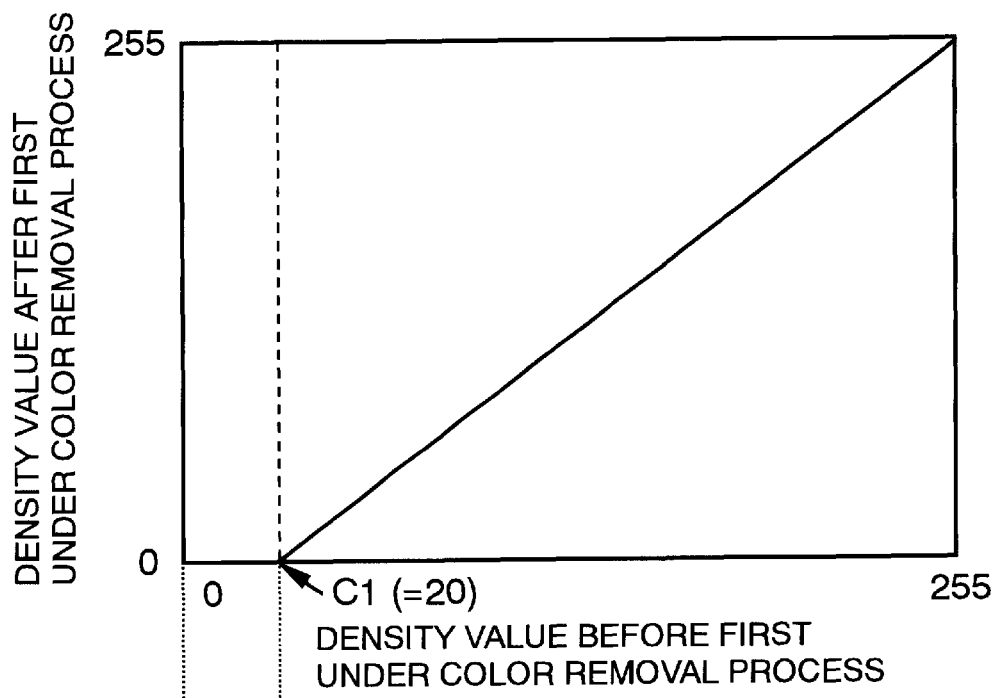
FIG. 9A and FIG. 9B are a graph showing the relation between the density values before and after the first under color removal process and a graph showing the relation between the density values before and after the second under color removal process.

First, the density data that corresponds to the horizontal axis of FIG. 9A are converted into the density data that corresponds to the vertical axis of FIG. 9A by means of the first under color removal process at the first under color removing unit 12. Since the first removal amount C1 is "20," the density values below 20 are converted to "0." The density values 20–255 are converted to density values of 0–255.

Figure 9B:
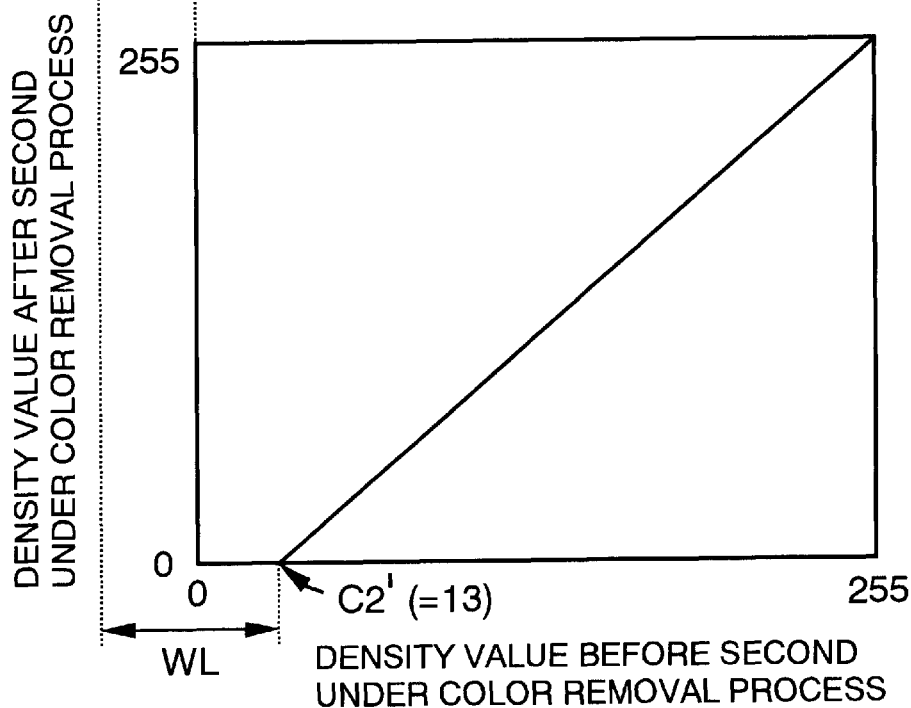

On the other hand, the density data shown on the horizontal axis of FIG. 9B are converted to the density data shown on the vertical axis of FIG. 9B by means of the second under color removal process at the second under color removing unit. Since the correction value C2' of the second removal amount is "13," the density values below 13 are converted to "0." The density values of 13–255 are converted to the density values of 0–255. The correction value C2' of the second removal amount corresponds to "12" in the density data before the first under color removal process. Therefore, by the first under color removal process and the second under color removal process, the target removal amount WL (=32) that corresponds to the removal level specified by the user is achieved.

Hence, since the embodiment 2 is equipped with the setup unit 30 for automatically setting the first removal amount and the second removal amount, an appropriate removal amount can be simply set up.

Embodiment 3

The compression and expansion process is used to reduce the capacity requirement of the memory 21 for storing the image data. The compression and expansion process is not necessary if the capacity of the memory 21 is sufficiently larger than the capacity of the image data. Therefore, it is preferable to determine whether the compression and expansion process is to be used based on the relation between the image data capacity and the capacity of the memory 21. More specifically, a comparison unit is provided in the image processing unit 10 for comparing the image data capacity and the capacity of the memory 21. If the image data capacity is judged to be smaller than the capacity of the memory 21, the image processing unit 10 executes the under color removal process by means of the first under color removing unit, while refraining from executing the compression and expansion process and the second under color removal process. Therefore, it can avoid the generation of the mosquito noise due to the unnecessary compression and expansion process.

Figure 10:
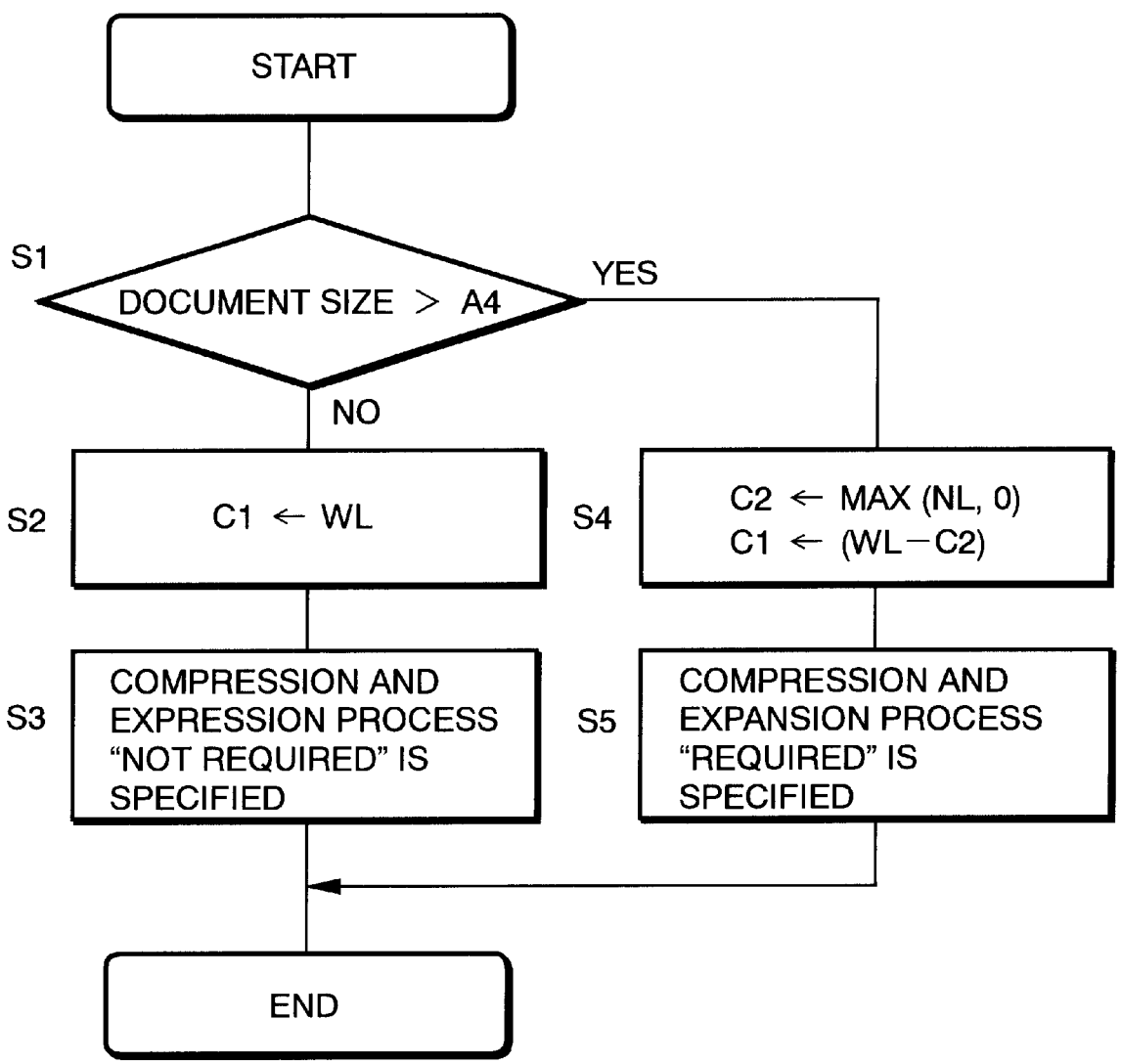
FIG. 10 is a flow chart of the procedure in a comparison unit according to the embodiment 3.

Now, the procedure for determining whether the compression and expansion process is to be used is described referring to the flow chart on FIG. 10.

First, it is determined whether the size of the document to be read by the image reading unit 50 is larger than the specified value (step S1). For example, if the capacity of memory 21 is sufficient to store the image data of a document equal to or smaller than the A4 size, but it is insufficient to store the image data of a B4 size document, the specified value is set as the A4 size.

If the document size is not larger than the specified value, the compression and expansion process and the second under color removal process are not necessary, so that the target removal amount WL is set up as the first removal amount C1 (step S2). Next, the compression and expansion process "not required" is specified (step S3). As a consequence, the image data is stored in the memory without being compressed after the first under color removal process is undertaken. The expansion process and the second under color removal process are not applied to the image data read from the memory 21.

On the other hand, if the document size is larger than the specified value, the compression and expansion process and the second under color removal process are necessary, so that "MAX(NL, 0)" is set at the second removal amount C2, while the value obtained by subtracting the second removal amount C2 from the target removal amount WL is specified as the first removal amount C1 (step S4). Next, the compression and expansion process "required" is specified (step S5). Consequently, the image data is stored in the memory 21 after being compressed after the first under color removal process. The expansion process and the second under color removal process are applied to the image data read from the memory 21.

It is obvious that this invention is not limited to the particular embodiments shown and described above but may be variously changed and modified without departing from the technical concept of this invention.

Although the digital copying machine is mentioned as an applicable example in the embodiments 1, 2 and 3, the present invention is applicable to an image reading apparatus such as a scanner for reading the document image and an image forming apparatus such as a printer for printing the image data on a paper. More specifically, it is accomplished by providing an image processing unit which is approximately similar to the image processing unit mentioned in the embodiments 1, 2 and 3.

Figure 11:
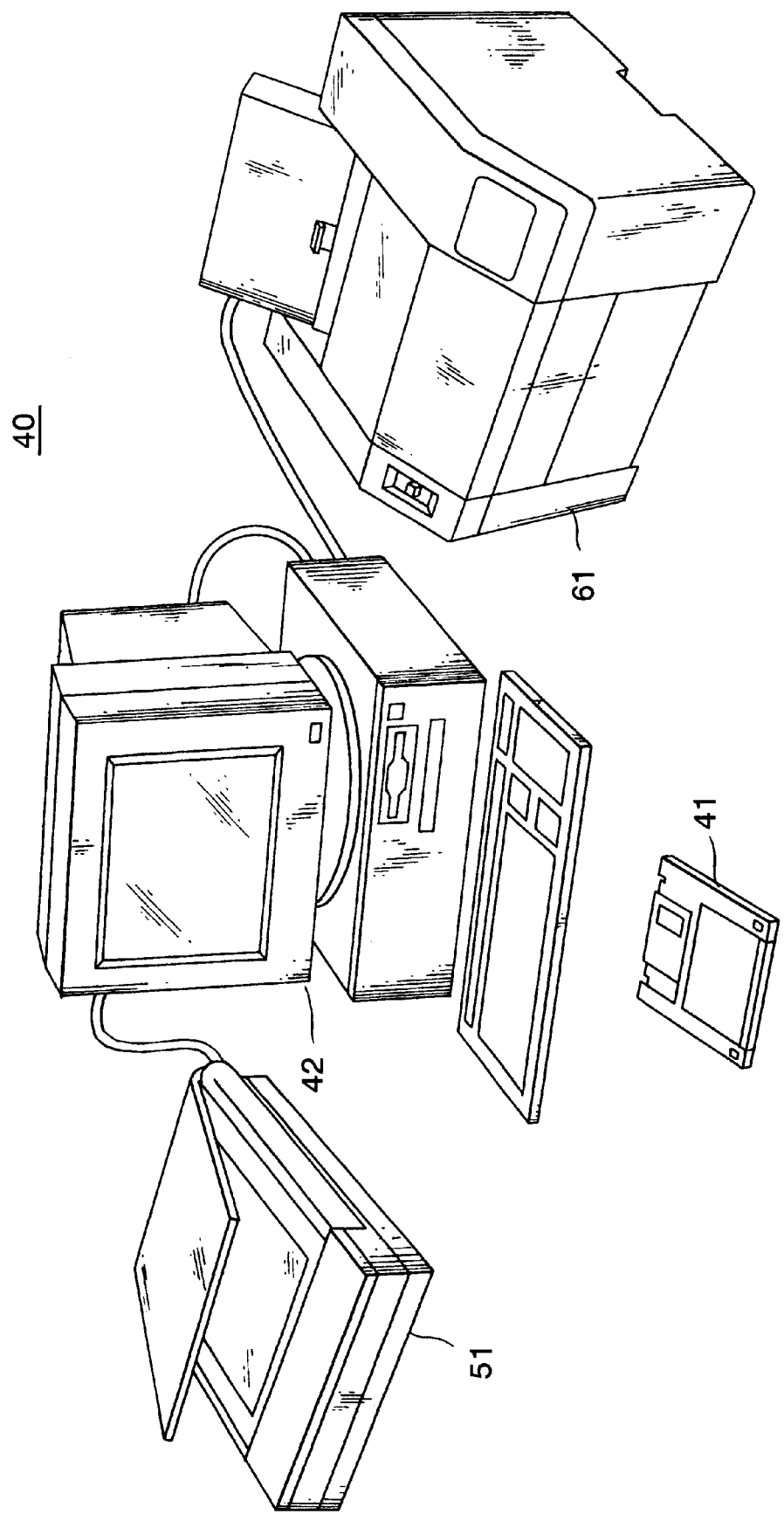
FIG. 11 is a perspective illustration according to another embodiment.

It is also applicable to computers such as personal computers by providing a computer program product having a program that corresponds to the operation sequence of the image processing unit. The computer program product includes the program and a recording medium where the program is stored. More specifically, an image processing system 40 shown in FIG. 11 is cited. The system 40 consists of an image reading apparatus 51, an image forming apparatus 61 and a personal computer 42. The computer 42 functions as an image processing unit based on the program provided by a floppy disk 41, which is the computer program product. Therefore, the computer 42 applies a specified image processing to the image data from the image reading apparatus 51 and outputs the resultant data to an image forming apparatus 61.

What is claimed is:

1. An apparatus for processing images comprising:
   a compression-expansion unit for executing a compression and expansion process on an image data using discrete cosine transform;
   a first under color removing unit for applying an under color removal process to the image data before the compression and expansion process, said first under color removing unit adapted to reduce a density value of image data when the density value is below a first specified value; and
   a second under color removing unit for applying an under color removal process to the image data after the compression and expansion process, said second under color removing unit adapted to reduce a density value of image data when the density value is below a second specified value.

2. An apparatus as claimed in claim 1, further comprising a setup unit for setting removal amounts of the under color removal processes.

3. An apparatus for processing images comprising:
   a compression-expansion unit for executing a compression and expansion process on an image data using discrete cosine transform;
   a first under color removing unit for applying an under color removal process to the image data before the compression and expansion process;
   a second under color removing unit for applying an under color removal process to the image data after the compression and expansion process; and
   a setup unit for setting removal amounts of the under color removal processes,
   wherein said setup unit sets up the removal amounts according to a compression ratio of the image data.

4. An apparatus for processing images comprising:
   a compression-expansion unit for executing a compression and expansion process on an image data using discrete cosine transform;
   a first under color removing unit for applying an under color removal process to the image data before the compression and expansion process;
   a second under color removing unit for applying an under color removal process to the image data after the compression and expansion process; and
   a memory unit for storing the image data and a comparison unit for comparing a capacity of the image data and a capacity of said memory unit, wherein, when the capacity of the image data is smaller than the capacity of said memory unit, the under color removal process by the first under color removing unit is executed to the image data while the compression and expansion process is not executed.

5. An apparatus as claimed in claim 1, further comprising an image reading unit for reading a document image to generate an image data to be processed.

6. An apparatus as claimed in claim 1, further comprising an image forming unit for printing the processed data on a paper.

7. A method for processing images comprising the steps of:

executing a compression and expansion process on an image data using discrete cosine transform;

applying an under color removal process to the image data before the compression and expansion process, the under color removal process reducing a density value of image data when the density value is below a specified value; and applying an under color removal process to the image data after the compression and expansion process, the under color removal process reducing a density value of image data when the density value is below a specified value.

8. A method as claimed in claim 7, further comprising a step of setting removal amounts of the under color removal processes.

9. A method for processing images comprising the steps of:

executing a compression and expansion process on an image data using discrete cosine transform;

applying an under color removal process to the image data before the compression and expansion process;

applying an under color removal process to the image data after the compression and expansion process;

setting removal amounts of the under color removal processes; and calculating the removal amounts according to a compression ratio of the image data.

10. A method for processing images comprising the steps of:

executing a compression and expansion process on an image data using discrete cosine transform;

applying an under color removal process to the image data before the compression and expansion process;

applying an under color removal process to the image data after the compression and expansion process; and comparing a capacity of the image data and a capacity of a memory unit for storing the image data, wherein the step of executing the compression and expansion process is omitted when the capacity of the image data is smaller than the capacity of the memory unit.

11. A method as claimed in claim 7, further comprising a step of reading a document image to generate an image data to be processed.

12. A method as claimed in claim 7, further comprising a step of printing on a paper the processed image data.

13. A computer program product for processing images comprising computer code for performing the steps of:

executing a compression and expansion process on an image data using discrete cosine transform;

applying an under color removal process to the image data before the compression and expansion process, the under color removal process reducing a density value of image data when the density value is below a specified value; and applying an under color removal process to the image data after the compression and expansion process, the under color removal process reducing a density value of image data when the density value is below a specified value.

14. A computer program product as claimed in claim 13, further comprising a step of setting removal amounts of the under color removal processes.

15. A computer program product for processing images comprising computer code for performing the steps of:

executing a compression and expansion process on an image data using discrete cosine transform;

applying an under color removal process to the image data before the compression and expansion process;

applying an under color removal process to the image data after the compression and expansion process;

setting removal amounts of the under color removal processes; and calculating the removal amounts according to a compression ratio of the image data.

16. A computer program product for processing images comprising computer code for performing the steps of:

executing a compression and expansion process on an image data using discrete cosine transform;

applying an under color removal process to the image data before the compression and expansion process;

applying an under color removal process to the image data after the compression and expansion process; and comparing a capacity of the image data and a capacity of a memory unit for storing the image data, wherein the step of executing the compression and expansion process is omitted when the capacity of the image data is smaller than the capacity of the memory unit.

17. A computer program product as claimed in claim 13, further comprising a step of reading a document image to generate an image data to be processed.

18. A computer program product as claimed in claim 13, further comprising a step of printing on a paper the processed image data.

19. An apparatus as claimed in claim 1, wherein for each of said first and second under color removing units, the density value of the image data is reduced to "0" when the density of the image data is below the corresponding specified value.

20. A method as claimed in claim 7, wherein for each step of applying the under color removal process, the density value of the image data is reduced to "0" when the density of the image data is below the corresponding specified value.

21. A computer program product as claimed in claim 13, wherein for each step of applying the under color removal process, the density value of the image data is reduced to "0" when the density of the image data is below the corresponding specified value.

22. An apparatus for processing images comprising:

a compression-expansion unit for executing a compression and expansion process on an image data using discrete cosine transform;

a first under color removing unit for applying an under color removal process to the image data before the compression and expansion process, the first under color removing unit adapted to reduce a density value of image data when the density value is below a first specified value;

an under color removal black paint unit for converting image data processed by the first under color removing unit before the compression and expansion process, the under color removal black paint unit adapted to convert the image data from CMY-image data to CMYK-image data; and a second under color removing unit for applying an under color removal process to the image data after the compression and expansion process, the second under color removing unit adapted to reduce a density value of image data when the density value is below a second specified value.

23. A method for processing images comprising the steps of:

executing a compression and expansion process on an image data using discrete cosine transform;

applying a first under color removal process to the image data before the compression and expansion process, the first under color removal process reducing a density value of image data when the density value is below a first specified value;

applying an under color removal black paint process to the image data processed by the first under color removal process before the compression and expansion process, the under color removal black paint process converting the image data from CMY-image data to CMYK-image data; and applying a second under color removal process to the image data after the compression and expansion process, the second under color removal process reducing a density value of image data when the density value is below a second specified value.

24. A computer program product for processing images comprising computer code for performing the steps of:

executing a compression and expansion process on an image data using discrete cosine transform;

applying a first under color removal process to the image data before the compression and expansion process, the first under color removal process reducing a density value of image data when the density value is below a first specified value;

applying an under color removal black paint process to the image data processed by the first under color removal process before the compression and expansion process, the under color removal black paint process converting the image data from CMY-image data to CMYK-image data; and applying a second under color removal process to the image data after the compression and expansion process, the second under color removal process reducing a density value of image data when the density value is below a second specified value.

* * * * *